March 2, 1971     R. L. DAHLQUIST     3,566,588

MOUNTING MECHANISM FOR HARVESTING ATTACHMENT

Filed Dec. 6, 1968     2 Sheets-Sheet 1

INVENTOR.
ROBERT L. DAHLQUIST.
BY
SETTLE, BATCHELDER & OLTMAN.
ATT'YS.

March 2, 1971  R. L. DAHLQUIST  3,566,588

MOUNTING MECHANISM FOR HARVESTING ATTACHMENT

Filed Dec. 6, 1968  2 Sheets-Sheet 2

INVENTOR.
ROBERT L. DAHLQUIST.
BY
SETTLE, BATCHELDER & OLTMAN.
ATT'YS.

United States Patent Office 3,566,588
Patented Mar. 2, 1971

3,566,588
MOUNTING MECHANISM FOR HARVESTING ATTACHMENT
Robert L. Dahlquist, Rock Island, Ill., assignor to
J. I. Case Company, Racine, Wis.
Filed Dec. 6, 1968, Ser. No. 781,724
Int. Cl. A01d *41/02, 41/04, 41/10*
U.S. Cl. 56—20                                    7 Claims

ABSTRACT OF THE DISCLOSURE

A device for releasably retaining a harvesting attachment on a supporting mechanism. The device includes a first member connected to the mechanism and having a retaining portion and inclined surfaces for guiding a lug on a second member carried by the attachment into the retaining portion with locking means for securing the members to each other.

BACKGROUND OF THE INVENTION

The present invention relates generally to harvesting machines and more particularly to an improved mounting mechanism for releasably supporting a harvesting attachment on the propelling device of a harvesting machine.

In recent years the versatility of harvesting machines, such as combines, has been greatly increased by providing a propelling mechanism which incorporates the separating mechanism of the combine. The propelling mechanism is designed so as to be capable of having various types of attachments connected to the forward end thereof.

Usually, the harvesting attachments are pivotally supported adjacent the forward end of the propelling mechanism or combine chassis by a pair of spaced brackets which support bearing members carried by a transversely extending shaft carried by the harvesting attachment. Thus, the harvesting attachment, such as a combine header or corn head, may be raised and lowered with respect to the combine chassis by pivoting the attachment on the forward end of the chassis.

Of course, if a propelling mechanism is to be designed for use with various types of attachments, it is absolutely necessary that the change of attachments can be made in a short period of time and preferably by one person. This of course is necessary since in many instances, the farmer is operating completely independently and does not have help available to assist him in making the various changes of attachments.

For many years, it has been standard practice to provide a pair of generally U-shaped brackets fixedly secured to the forward end of the frame of the propelling mechanism with the legs of the U-shaped brackets extending substantially horizontally forwardly and having vertically aligned openings therein. The pivot axis on the harvesting attachment has also included bearing type members, generally circular in diameter and usually having a pair of lugs having recesses therein integral with the integral surface of the bearing. The bearings are then received in the U-shaped portions of the brackets and a pin is manually located in the openings and the recesses to attach and maintain an interconnection between the bearing and the bracket.

This type of mounting mechanism has several disadvantages. The primary disadvantage is that there is no provision for compensating for vertical misalignment of the bearings and the brackets. Thus, it was heretofore necessary that the harvesting attachment be very specifically positioned so that the respective bearing members were in proper horizontal alignment with respect to the brackets so that the operator could then drive the propelling mechanism forwardly and force the U-shaped portion of the bracket into engagement with the bearing member.

Another disadvantage of the prior art structure is that the operator could not in any way determine whether the openings and recesses were properly aligned so as to receive the connecting pin or rod without having to get off of the propelling mechanism and attempt to insert the pins.

SUMMARY OF THE INVENTION

The present invention provides a simple and efficient mounting mechanism for releasably attaching a harvesting attachment to a propelling mechanism and which includes a first portion having guiding areas for contacting appropriate portions of a second portion of the bracket with the two portions or members being specifically designed so as to automatically compensate for minor misalignment between the members. The mounting mechanism also incorporates an automatic locking mechanism which locks the members to each other when proper alignment is obtained.

Thus, the primary object of the present invention is to provide a simple and efficient mounting mechanism for connecting a harvesting attachment to a combine chassis.

Another object of the present invention is to provide a two-piece mounting mechanism which has cooperating portions that interact to automatically align the two pieces for attachment to each other.

Other objects of this invention will appear in the following description and appended claims reference being had to the accompanying drawings forming a part of this specification wherein like reference characters designate corresponding parts in the several views.

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology of terminology employed herein is for the purpose of description and not of limitation.

Figure 1:
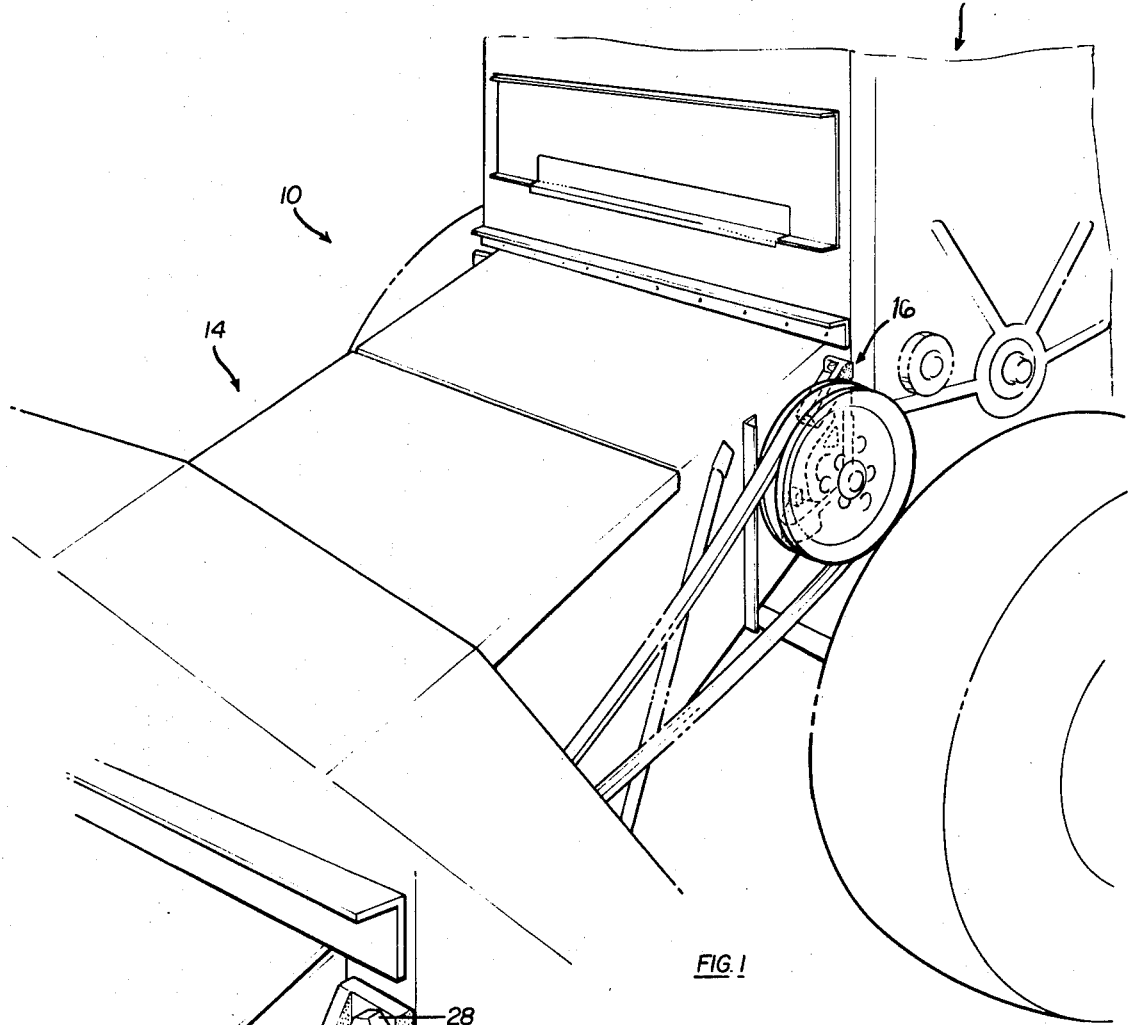
FIG. 1 discloses a fragmentary perspective view of a harvesting machine having the present incorporated therein.

FIG. 1 of the drawings discloses a portion of a harvesting mechanism 10, such as a combine, which includes a propelling mechanism or combine chassis 12 and a harvesting attachment or combine header 14 pivotally interconnected at adjacent ends by brackets 16. Since the combine chassis and the harvesting attachment form no part of the present invention, these parts have been shown in fragmentary phantom solely for the purpose of providing a proper environment for the present invention.

Conventionally, the harvesting attachment 14 includes a transversely extending shaft 18 adjacent the rear end thereof which has a pulley 19 on one end thereof. The pulley of course is connected to various movable elements through suitable belts for driving the various elements of the harvesting attachment. The cross-shaft 18 defines the pivot axis for the harvesting attachment and is therefor connected by the brackets 16 to the combine chassis.

According to the present invention, a pair of brackets 16 are disposed adjacent opposite sides of the rear end of the harvesting attachment 14 for connection of the attachment to the propelling mechanism 12. However, since both brackets or mounting mechanisms 16 are identical in construction, only one has been shown in the drawings.

Figure 3:
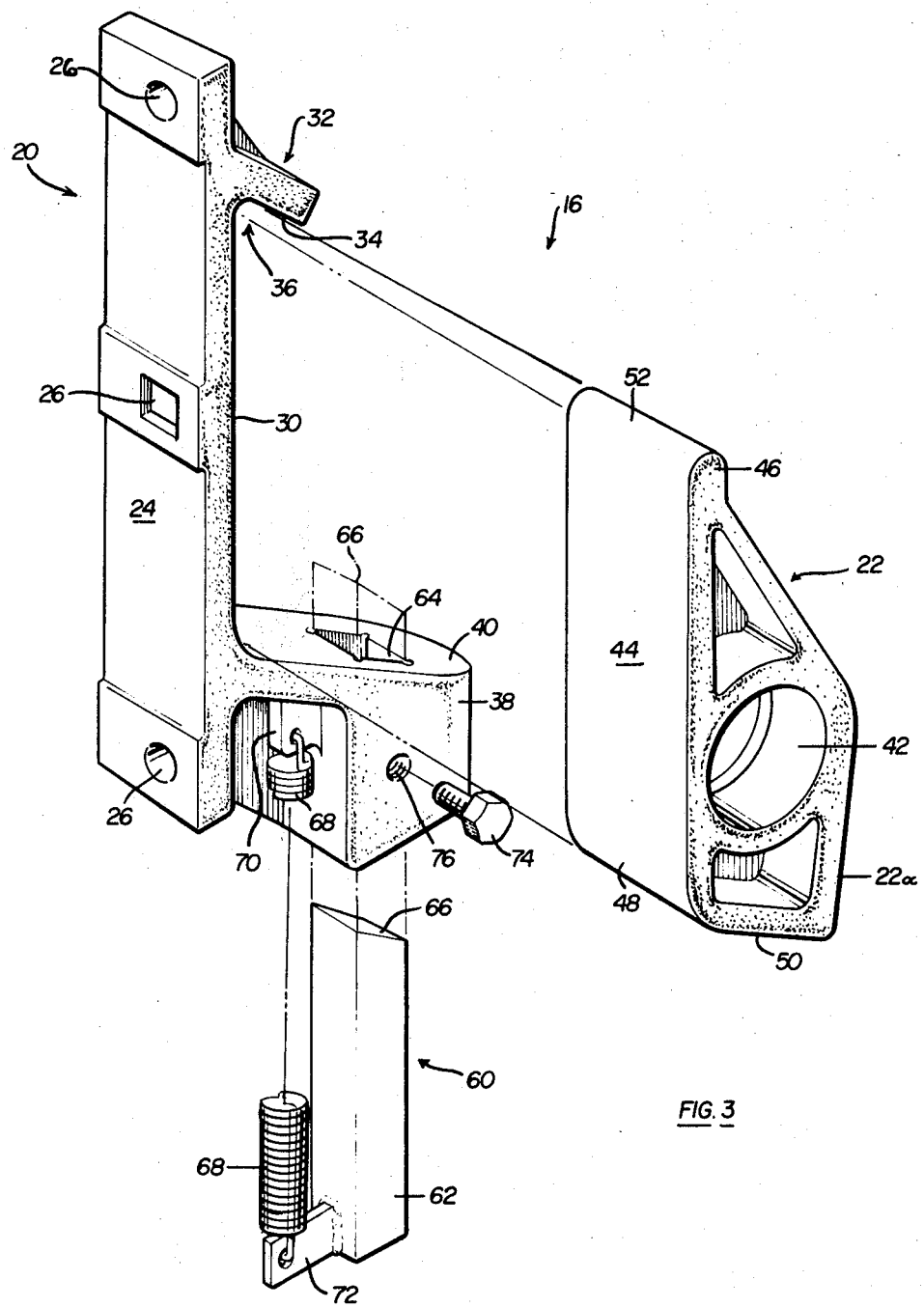
FIG. 3 is an enlarged exploded perspective view of the mounting mechanism constructed in accordance with the present invention.

Referring now to FIG. 3 of the drawings, it will be seen that the mounting mechanism or apparatus includes a bracket or first member 20 and a bearing support member or pivot member 22. The bracket 20 includes a main body portion 24 having vertically spaced openings 26 which receive bolts 28 for connecting the bracket 20 to the forward end of the combine chassis or propelling mechanism 12.

The forward end of the bracket 20 has a vertically extending substantially flat first surface 30 defined thereon with retaining means 32 adjacent the upper end thereof. The retaining means is in the form of a lug which defines an acute angled second surface 34 with respect to the vertically extending surface 30. The surfaces 30 and 34 thus co-operate to define a recess 36 adjacent or at the upper end of the first or vertically extending flat surface 30.

The lower end of the bracket 20 further includes means 38 for defining an obtuse angled surface 40 with respect to the flat vertically extending surface 30. As can more readily be seen for an inspection of FIG. 2, the surface 40 is inclined forwardly and downwardly with respect to the vertically extending surface 30, for a purpose which will become apparent hereinafter.

The bearing support member 22 has a transversely extending opening 42 for receiving the transversely extending shaft 18. Of course, the opening is sized so as to receive the shaft 18 and allow pivotal movement of the pivot member 22 on the shaft 18. Also, the sizing of the openings 42 may be sufficient to receive and support bearings (not shown) therein. Likewise, in actual construction, suitable members are disposed on opposite sides of each bracket or member 22 so as to maintain the axial positioning of the member 22 on the shaft 18. However, since these members form no part of the present invention, they have been eliminated in the drawings in an effort to promote clarity of the present invention.

The bearing support or pivot member 22 further includes a flat vertically extending surface 44 which is substantially identical in size and configuration to the vertically extending surface 30 on the bracket 20. Adjacent the upper end of the flat surface 44, the member 22 includes means defining a lug or projection 46 which is adapted to be received in the recess 36 of the bracket 20, as will become apparent hereinafter. The lower end of the flat surface merges through a camming surface 48 with an inclined contacting surface 50 with the included angle between the surfaces 44 and 50 being substantially equal to the included angle between the surfaces 30 and 40 of the bracket 20. Preferably, the lug 46 likewise includes a camming surface 52 for guiding the member 22 on the bracket 20 in manner which will become apparent hereinafter.

The mounting mechanism of the present invention further includes locking means carried by one of the members 20 or 22 for releasably interconnecting the members when they are in proper position with respect to each other. The locking means 60 in the illustrated embodiment includes a latch 62 which is slideably supported in an opening 64 formed on the member or projection 38 defining the inclined surface 40. The latch 62 has a free end 66 which is adapted to extend above the surface 40 and be in engagement with a portion of the member 22 to securely lock the member on the bracket 20. Prefer- ably, the free end 66 has an inclined surface with the inclination of the surface being equal to or slightly greater than the surface 40 with respect to the surface 30, for a purpose which will become apparent hereinafter.

The locking means 60 further includes means for normally maintaining the latch device in a first locking position in which the free end thereof is disposed above the surface 40 but which is yieldable to allow the latch device 62 to move to a second release position in which the free end 66 is disposed below the surface 40 of the bracket 20. In the illustrated embodiment, the means described above includes a spring 68 having one end carried by a projection 70 extending from the member 38 and the opposite end connected to a second projection 72 carried by the latch 62. Thus, the spring will normally maintain the latch device in a position wherein the free end 66 is in the position shown by the phantom line of FIG. 3. Of course, this position is defined by the location of the projection or lug 72 on the latch device or pin 62 since the spring will normally produce a sufficient tension to maintain the lug 72 in engagement with the lower surface of the member 38.

Preferably, means are also provided for releasably maintaining the latch device or pin 62 in the second position in which the free end thereof is disposed below the surface 40. In the illustrated embodiment, this means is in the form of a set screw 74 threadedly received in an opening 76 defined on the member 38 and communicating with the opening 64. Thus, threading the set screw 74 in the opening 76 will lock the latch pin 62 in any predetermined position. Of course, in actual use the set screw 74 could be utilized for locking the pin 62 in either of the two positions. This might be preferred in order to prevent the pin from being removed if for any reason the spring 68 should become ineffective.

OPERATION

It is believed that the operation of the mounting mechanism will be appreciated from the above description. However, to promote clarity, applicant will briefly describe the preferred manner of utilizing the mounting mechanism or means for attaching the harvesting attachment to the combine chassis. Assuming that the harvesting attachment is disconnected from the chassis and the operator is in the process of making the appropriate connection, the first step in making the connection is to locate the transverse shaft 18 in approximate vertical alignment with the brackets 20 on the chassis 12. This of course may be accomplished by suitable jacks or other devices.

Figure 2:
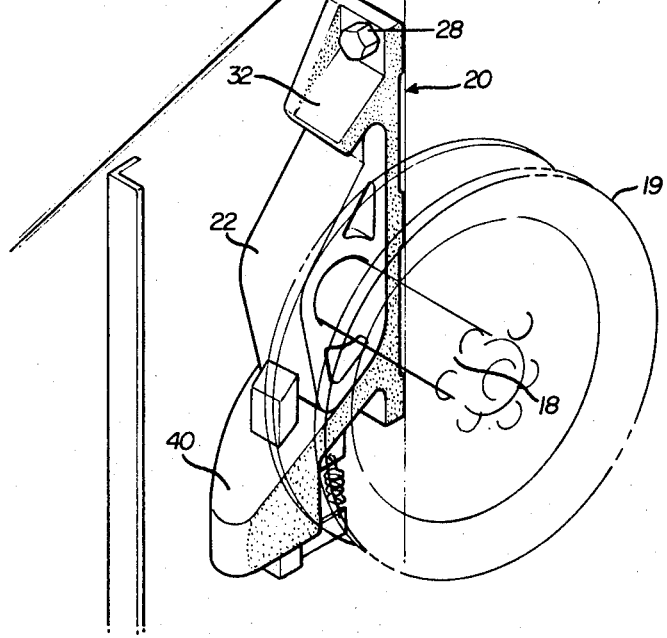
FIG. 2 is an enlarged fragmentary perspective view of the attaching area for the harvesting mechanism with most of the harvesting mechanism shown in phantom lines.

The next step is to pivot the members 22 in a clockwise direction as viewed in FIG. 2 so as to locate the surfaces 44 at a small acute angle with respect to the horizontal position. Of course, it is apparent that the positioning of the surface may be at any particular angle so long as the camming surface 52 thereof is located in a plane slightly above the lower edge of the downwardly and forwardly inclined surface 40.

After the members 22 have been positioned in the manner described above, the operator need only propel the combine chassis or propelling mechanism 12 forwardly to produce relative movement between the first and second members forming the mounting mechanism 16. The relative movement of the two members will first cause an engagement of the camming surface 52 with respect to the surface 30. Continued relative movement between the members 20 and 22 will cause the camming surface to ride upwardly on the flat surface 30 and eventually be received in the recess 36. Of course, during this movement, the latch pins 62 will be forced from the latched position to the release position by engagement of the surfaces 44, 48 and 50 with the inclined surface on end 66. Continued relative movement as described above, will eventually cause the camming surface 48 to engage the downwardly and forwardly inclined surface 40 and cause the above mentioned movement of the projection or lug 46 into the recess 36. When the projection or lug 46 is located within the recess 34, the surfaces 30 and 44 as well as the surfaces 40 and 50 are in juxtaposed relationship or in engagement with each other and the latch pin 62 is then free to move upwardly adjacent the forward surface 22a of the member 22. It will be appreciated that the biasing means 68 will automatically move the latch pin 62 to the locking position when the surfaces 30 and 44 are in engagement with each other.

Of course, disconnection of the attachment from the mechanism 12 is accomplished by locking the pins in the released position by set screws 74 and backing the mechanism away from the attachment.

It is readily apparent that the present invention provides a simple and efficient mechanism for interconnecting and automatically aligning a harvesting attachment with a combine chassis. It can be appreciated from the above description that the misalignment may be as much as the vertical distance between the lower edge of the retaining means or lug 32 and the lower edge of the surface 40. Of course, this distance can be any desired number of inches depending upon the size of the bracket.

While the means for maintaining the locking pin in first and second positions has been illustrated as a set screw and a spring, it is readily apparent that various types of devices could be substituted for these elements without departing from the spirit of the invention. For example, a suitable type camming arrangement could be located adjacent the member 38 and cooperate with the latch pin 62 so as to allow a mechanical shifting of the latch pin from the locking position to the released position. With this arrangement, the set screw 74 could, if desired, be eliminated since the set screw 74 is really only necessary for disconnecting the harvesting attachment from the chassis.

Alternatively, the latching mechanism or latch pin could be spring biased to the locking position and could be solenoid actuated to the release position by a suitable type of solenoid cooperating with the latch pin 62.

Having thus described my invention, I claim:

1. Mounting mechanism for aligning and interconnecting a harvesting attachment and a propelling mechanism comprising a bracket secured to said propelling mechanism and having a substantially vertically extending first surface, means defining an acute angled surface adjacent one end of said first surface to define a recess at said one end of said first surface, means defining an obtuse angled surface adjacent the opposite end of said first surface, a bearing support member pivotally supported on said harvesting attachment and having a second surface corresponding substantially to said first surface, means defining a lug adjacent one end of said second surface adapted to be received in said recess, means defining a contacting surface adjacent the opposite end of said second surface, and locking means carried by one of said bracket and said member whereby said member may be pivoted on said attachment to place said first and second surface at an acute angle and whereby relative movement of said bracket and member will cause (a) engagement of said lug with said first surface and (b) pivotal movement of said member on said attachment to (1) place said first and second surfaces and said obtuse angled and contacting surfaces in engagement with each other and (2) force said lug into said recess and (3) allow said locking means to be actuated and secure said attachment to said mechanism.

2. Apparatus as defined in claim 1, including the further improvement of means defining camming surfaces on said lug and said contacting surface, respectively, said camming surfaces respectively engaging said first surface and said obtuse angled surface to induce said pivotal movement of said member.

3. Apparatus as defined in claim 1, including the further improvement of said locking means comprising a latch device having a free end and carried by said bracket, means normally maintaining said latch device in a first locking position wherein said free end is disposed above said obtuse angled surface but yieldable to a second release position wherein said free end is disposed below said surface whereby said relative movement of said bracket and member will cause said latch device to move from said first to said second position and said last means will return said latch device to said first locking position when said first and second surfaces are in engagement with each other.

4. A coupling device for connecting an implement to a vehicle chassis comprising a pair of spaced brackets secured to said chassis, each of said brackets having a substantially flat vertically extending first surface outwardly of said frame and means defining a recess at the upper end of said flat surface, a pair of spaced bearing support members carried by said implement and received by said brackets, said bearing support members each having a flat first surface substantially parallel to said flat first surfaces of said brackets and means defining a projection at the upper end of said flat first surfaces of said bearing support members, adapted to be engaged in said recess of said brackets, means defining cooperating parallel second surfaces extending from the lower ends of said flat first surfaces of said brackets and bearing support members, and yieldable latch means operatively disposed between said brackets and bearing support members to automatically lock said bearing support members to said brackets when (1) said flat first surfaces of said brackets and said bearing support members and said parallel second surfaces of said brackets and bearing support members are in coplanar abutting engagement with each other and (2) when said projections of said bearing support members are disposed in said recess of said brackets.

5. Apparatus for aligning and releasably connecting a combine header for pivotal movement on the forward end of a combine chassis comprising:

a pair of transversely spaced horizontally aligned brackets secured to the forward end of said chassis, each of said brackets having an outer substantially flat surface with retaining means extending from the upper end of said outer surface comprising a flange inclined downwardly with respect to said outer surfaces and a forwardly and downwardly inclined surface at the lower end thereof, and a latch member carried by said bracket with a free end normally disposed above said inclined surface but yieldable to move below said inclined surface;

a pair of bearing support members pivotally supported at transversely spaced points on a shaft member supported on said combine header;

each of said bearing support members having a first surface corresponding substantially to said outer surfaces of said brackets, retaining means extending from the upper end of said first surface for coacting cooperation with the retaining means of said brackets and having an inclined second surface extending from the lower end of said first surface for cooperating planar abutment on said inclined surfaces of said brackets when said cooperating retaining means are in locking engagement;

whereby said bearing support members may be pivoted to incline said first surfaces with respect to said flat outer surfaces of said brackets and movement of said brackets and said bearing support members towards each other causes engagement of said cooperating retaining means of said bearing supports with said flat outer surfaces of said brackets and continued movement will cause said cooperating retaining means on said brackets and said inclined second surfaces of said bearing supports into engagement with the latch members to move the latch members below said inclined surfaces of said brackets and said inclined surfaces of said brackets and inclined second surfaces of said bearing supports cooperate to correct any misalignment between said brackets and said bearing support members; and whereby said latch members lock said bearing support members to said brackets to thereby secure said header to said chassis when the first and inclined second surfaces of said bearing supports are juxtaposed in coplanar relationship said flat outer surfaces and said inclined surfaces respectively of said brackets.

6. Mechanism for releasably connecting an implement to a supporting frame comprising a first member connected to said supporting frame and having a first flat surface intermediate its upper and lower ends, flange means adjacent said upper and lower ends extending outwardly from said first surface and defining a recess, each of said flange means having a downwardly inclined opposed surface joining said first surface, a second member carried by said implement adapted to be received in said recess and cooperating with said first member for releasably retaining said implement on said frame, said second member having a first cooperating surface corresponding substantially to said first flat surface of said first member for coplanar abutment therewith, means extending from one end of said cooperating surface of said second member defining a projection adapted to engage one of said flange means within said recess, means at the other end of said first cooperating surface of said second member defining a second contacting surface adapted to engage the inclined surface of the other of said flange means and locking means interposed between said members for locking said second member to said first member when said projection is in engagement with said one flange means within said recess and said first flat surface of said firsts member and cooperating first surface of said second member are in flat coplanar abutment with each other.

7. Mechanism as defined in claim 6, including the further improvement of said locking means comprising a latch carried by one of said flange means having a portion extending into said recess and normally disposed above the inclined surface of said one flange means to lock said second member on said first member, said latch being yieldable to move below said inclined surface when said second member is moved into the recess of said first member and to release said second member from said first member.

References Cited
UNITED STATES PATENTS

| | | | |
|---|---|---|---|
| 3,220,487 | 11/1965 | Pilch | 172—274 |
| 3,237,795 | 3/1966 | Kromer | 172—275 |
| 3,362,143 | 1/1968 | Gullickson | 56—20 |
| 3,412,534 | 11/1968 | Teale | 56—2 |

ANTONIO F. GUIDA, Primary Examiner